US008286243B2

(12) United States Patent
Clark et al.

(10) Patent No.: US 8,286,243 B2
(45) Date of Patent: Oct. 9, 2012

(54) BLOCKING INTRUSION ATTACKS AT AN OFFENDING HOST

(75) Inventors: Adam Thomas Clark, Mantorville, MN (US); Christopher Thomas Gloe, Rochester, MN (US); Daniel Paul Kolz, Rochester, MN (US); Kathryn Ann Tri, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 11/876,967

(22) Filed: Oct. 23, 2007

(65) Prior Publication Data

US 2009/0106838 A1    Apr. 23, 2009

(51) Int. Cl.
*H04L 29/06* (2006.01)
(52) U.S. Cl. ............ 726/23; 726/22; 370/230; 370/235; 370/389; 370/392
(58) Field of Classification Search ............ 726/23, 726/22; 370/230, 235, 389, 392
See application file for complete search history.

(56) References Cited

U.S. PATENT DOCUMENTS

| | | | |
|---|---|---|---|
| 6,119,236 A | 9/2000 | Shipley | |
| 7,630,949 B1 * | 12/2009 | Duffield et al. | 706/48 |
| 2003/0033542 A1 * | 2/2003 | Goseva-Popstojanova et al. | 713/201 |
| 2003/0046583 A1 * | 3/2003 | Goldman et al. | 713/201 |
| 2003/0051026 A1 * | 3/2003 | Carter et al. | 709/224 |
| 2003/0149888 A1 * | 8/2003 | Yadav | 713/200 |
| 2003/0167404 A1 * | 9/2003 | Han et al. | 713/201 |
| 2005/0022028 A1 * | 1/2005 | Hall | 713/201 |
| 2005/0055708 A1 * | 3/2005 | Gould et al. | 725/25 |
| 2005/0076236 A1 * | 4/2005 | Stephenson | 713/201 |
| 2005/0076245 A1 * | 4/2005 | Graham et al. | 713/201 |
| 2005/0108393 A1 * | 5/2005 | Banerjee et al. | 709/225 |
| 2005/0108568 A1 * | 5/2005 | Bussiere et al. | 713/201 |
| 2005/0111460 A1 * | 5/2005 | Sahita | 370/395.3 |
| 2005/0216770 A1 * | 9/2005 | Rowett et al. | 713/201 |
| 2005/0262556 A1 * | 11/2005 | Waisman et al. | 726/22 |
| 2005/0273857 A1 * | 12/2005 | Freund | 726/23 |
| 2005/0283831 A1 | 12/2005 | Ryu et al. | |
| 2006/0026683 A1 * | 2/2006 | Lim | 726/23 |
| 2006/0037077 A1 * | 2/2006 | Gadde et al. | 726/23 |
| 2006/0053491 A1 * | 3/2006 | Khuti et al. | 726/23 |
| 2006/0059554 A1 * | 3/2006 | Akerman | 726/22 |
| 2006/0075498 A1 * | 4/2006 | Yeom | 726/23 |
| 2006/0085855 A1 * | 4/2006 | Shin et al. | 726/23 |
| 2006/0129382 A1 * | 6/2006 | Anand et al. | 704/9 |
| 2006/0137003 A1 * | 6/2006 | Glania | 726/11 |
| 2007/0192863 A1 * | 8/2007 | Kapoor et al. | 726/23 |

FOREIGN PATENT DOCUMENTS

WO     2005094035 A1   10/2005

* cited by examiner

*Primary Examiner* — Edan Orgad
*Assistant Examiner* — Bradley Holder
(74) *Attorney, Agent, or Firm* — Wood, Herron & Evans LLP (57) ABSTRACT

A method, apparatus, and program product are provided for protecting a network from intrusions. An offending packet communicated by an offending host coupled to a protected network is detected. In response to the detection, a blocking instruction is returned to the offending host to initiate an intrusion protection operation on the offending host, where the blocking instruction inhibits further transmission of offending packets by the offending host. At the offending host, a blocking instruction is received with a portion of an offending packet. The offending host verifies that the offending packet originated from the host. In response to the verification of the offending packet originating from the host, an intrusion protection operation is initiated on the host thereby inhibiting transmission of a subsequent outbound offending packet by the host.

22 Claims, 5 Drawing Sheets

BLOCKING INTRUSION ATTACKS AT AN OFFENDING HOST

FIELD OF THE INVENTION

The present invention relates to the field of computer security, and more particularly to the prevention of unauthorized intrusion into computer networks and systems.

BACKGROUND OF THE INVENTION

As information technology has become popularized with the assistance of the rapid development of information and communication technology combined with computers, network environments, and the Internet, so too has malicious network access, such as intrusions into server systems and the transmission of harmful traffic. A number of conventional security solutions are available to block malicious network accesses. These systems traditionally include the use of firewalls or dedicated network intrusion detection systems on a protected network.

Intrusion detection, in general, can be performed manually or automatically. Manual intrusion detection typically incorporates examining a log file system record or other evidence for signs of intrusions, including the amount of network traffic to or from a system or network. Systems that perform automatic intrusion detection are typically referred to as Intrusion Detection Systems (IDS). An IDS can be either host-based, if it monitors system calls or logs, or network-based if it monitors the flow of network packets. Conventional IDS's are generally a combination of these two approaches. When a probable intrusion is discovered by a conventional IDS, typical actions to perform include logging relevant information to a file or database, generating an email alert, or generating a message to a pager or mobile phone.

Determining what the probable intrusion actually is and taking some form of action to stop it or prevent it from happening again are usually outside the scope of intrusion detection. However, some forms of automatic reaction have been implemented through the interaction of Intrusion Detection Systems and access control systems such as firewalls.

Extrusion detection (or outbound intrusion detection) is a branch of intrusion detection aimed at developing mechanisms to identify successful and unsuccessful attempts to use the resources of a computer system to compromise other systems. Extrusion detection techniques generally focus on the analysis of system activity and outbound traffic in order to detect malicious users, networks or malware (malicious software) or network traffic that may pose a threat to the security of neighboring systems.

While intrusion detection is most concerned about the identification of incoming attacks (intrusion attempts), extrusion detection systems try to prevent attacks from being launched in the first place. They implement monitoring controls at "leaf" nodes of a protected network—rather than concentrating them at choke points, e.g. routers—in order to distribute the inspection workload and to take advantage of the visibility that a system has of its own state. The ultimate goal of extrusion detection is to identify attack attempts launched from an already compromised system in order to prevent them from reaching their target, thereby containing the impact of the threat.

Contemporary IDS and IPS (intrusion/extrusion defense) technologies, while effective, do not completely solve the problems associated with intrusion or extrusion attacks. If they do detect and initiate a defense, in most cases the prevention is implemented at the destination—either at the host or firewall in front of the host. The offending host or hosts may continue to launch the intrusion (in cases such as Denial of Service (DoS) or Distributed DOS (DDoS))—with the prevention including adding packet filters or dynamic logic to toss out or ignore the inbound offending packets, resulting in additional firewall or host processing.

What is needed therefore is a method for notifying an offending host of an intrusion attack so that proper action can be taken at the offending host to inhibit further transmission of the attack

SUMMARY OF THE INVENTION

Embodiments of the invention provide methods of protecting a network from intrusion attacks by notifying an offending host of the attack and taking action at the offending host based on an intrusion protection policy. An intrusion of an offending packet is detected, which is communicated by an offending host coupled to a protected network. A blocking instruction is returned to the offending host, in response to detecting the intrusion of the offending packet, to initiate an intrusion protection operation on the offending host. The blocking instruction inhibits further transmission of offending packets by the offending host. In some embodiments, at least a portion of the offending packet is sent back to the offending host with the blocking instruction.

At the offending host, the blocking instruction is received with, in some embodiments, the portion of the offending packet. The offending host verifies that the offending packet originated from the offending host and inhibits transmission of a subsequent outbound offending packet by the offending host based on an intrusion policy. In some embodiments the intrusion protection operation includes posting an event or error message for an operator of the offending host or accessing an intrusion policy on the offending host.

In one embodiment, sending a portion of the first offending packet back to the offending host includes encapsulating the portion of the offending data packet into a UDP packet and returning the encapsulated portion of the offending data packet to the offending host as a notification packet. At the offending host, the encapsulated UDP packet containing the portion of the offending packet is received. The offending host verifies that the first offending packet originated from the offending host. In some embodiments, the offending host may identify an offending application on the offending host that originated the offending packet, and may terminate the offending application.

In another embodiment, detecting the intrusion and returning the blocking instruction are implemented at an IP layer of an operating system. The blocking instruction is implemented as an ICMP message, and in some embodiments, the ICMP message contains a copy of the first offending packet. In other embodiments, detecting the intrusion and returning the blocking instruction are implemented in a network device such as a firewall, a router, or another computer.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the invention provide methods of protecting a network from intrusion attacks by notifying an offending host of the attack and taking action at the offending host based on an intrusion protection policy. An intrusion of an offending packet is detected on a computer or other network component coupled to a protected network. After detection, a blocking instruction is returned to the offending host to initiate an intrusion protection operation on the offending host. The intrusion protection operation inhibits further transmission of offending packets by the offending host. Using this approach in combination with contemporary prevention techniques may provide a more robust solution to intrusion and extrusion attacks.

Figure 1:
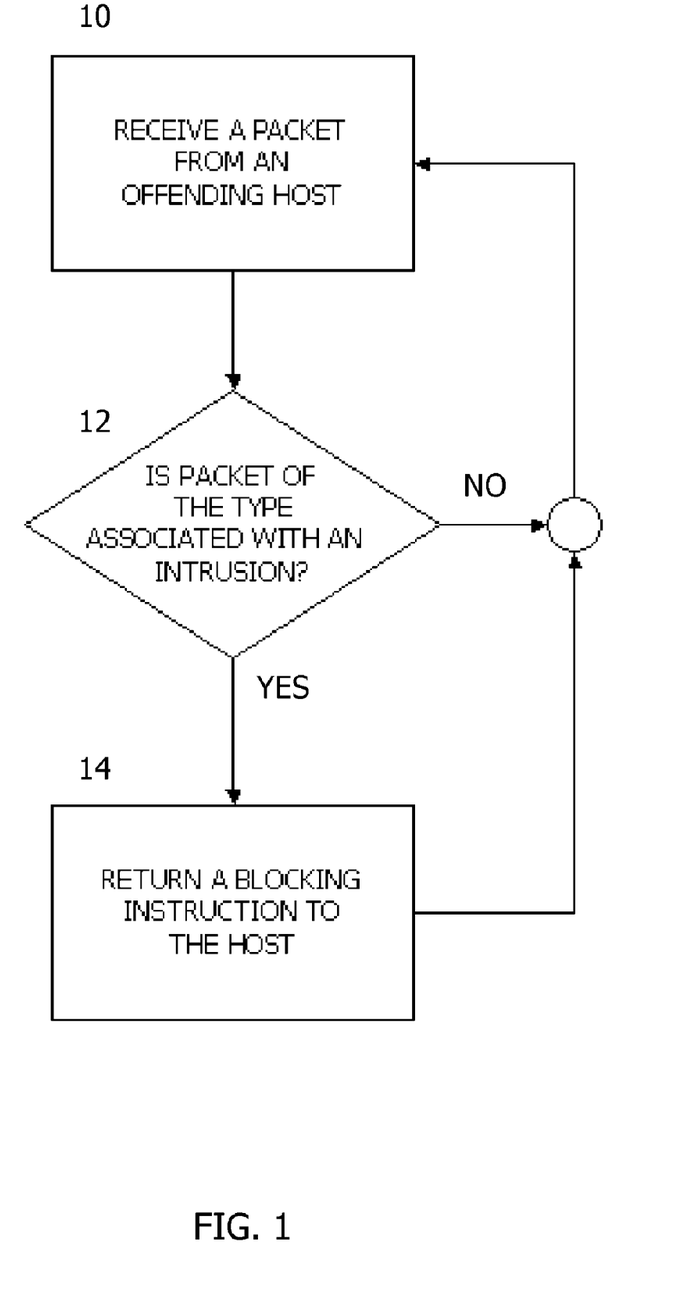
FIG. 1 is a flowchart showing the actions of a computer under an intrusion attack in connection with intrusion protection consistent with embodiments of the invention.

FIG. 1 illustrates the actions taken at a computer or network component on a protected network. The network component may be incorporated in contemporary intrusion protection, which may be a router or a firewall in some embodiments. A packet is received on the protected network from an offending host in block 10. This packet may be of the type associated with an intrusion (or extrusion) attack. As discussed above, both intrusions and extrusions are to be detected and potentially blocked at the offending host. For purposes of this application, both intrusions and extrusions will be referred to as intrusions. The computer or network component then checks the packet to see if it is an offending packet, such as a malformed packet, a denial of service (DoS) or a distributed denial of service (DDoS) packet, for example. If the packet is detected to be an offending packet ("yes" branch of decision block 12), then a blocking instruction is returned to the offending host in block 14. If the packet is not of the type associated with an intrusion ("no" branch of decision block 12), then the network component or computer continues to receive packets. In other embodiments incorporating contemporary intrusion protection operations, other actions may be taken as discussed above with IDS and IPS implementations.

A single offending host can send offending packets to many computers on many networks. This in turn can generate excessive network traffic as each of the computers transmits data back to the offending host. To assist in reducing the amount of network traffic, blocking instructions in some embodiments may be implemented on a computer in a protected network to be periodically sent to the offending host, rather than sent at a time an offending packet is received. The transmission of blocking instructions may be set so that the transmissions are sent at intervals but no more than a predetermined number of times. If an offending host is receiving more than a certain number of blocking instructions, the multiple receipts may indicate that there is an actual problem at the offending host which should be addressed.

Figure 2:
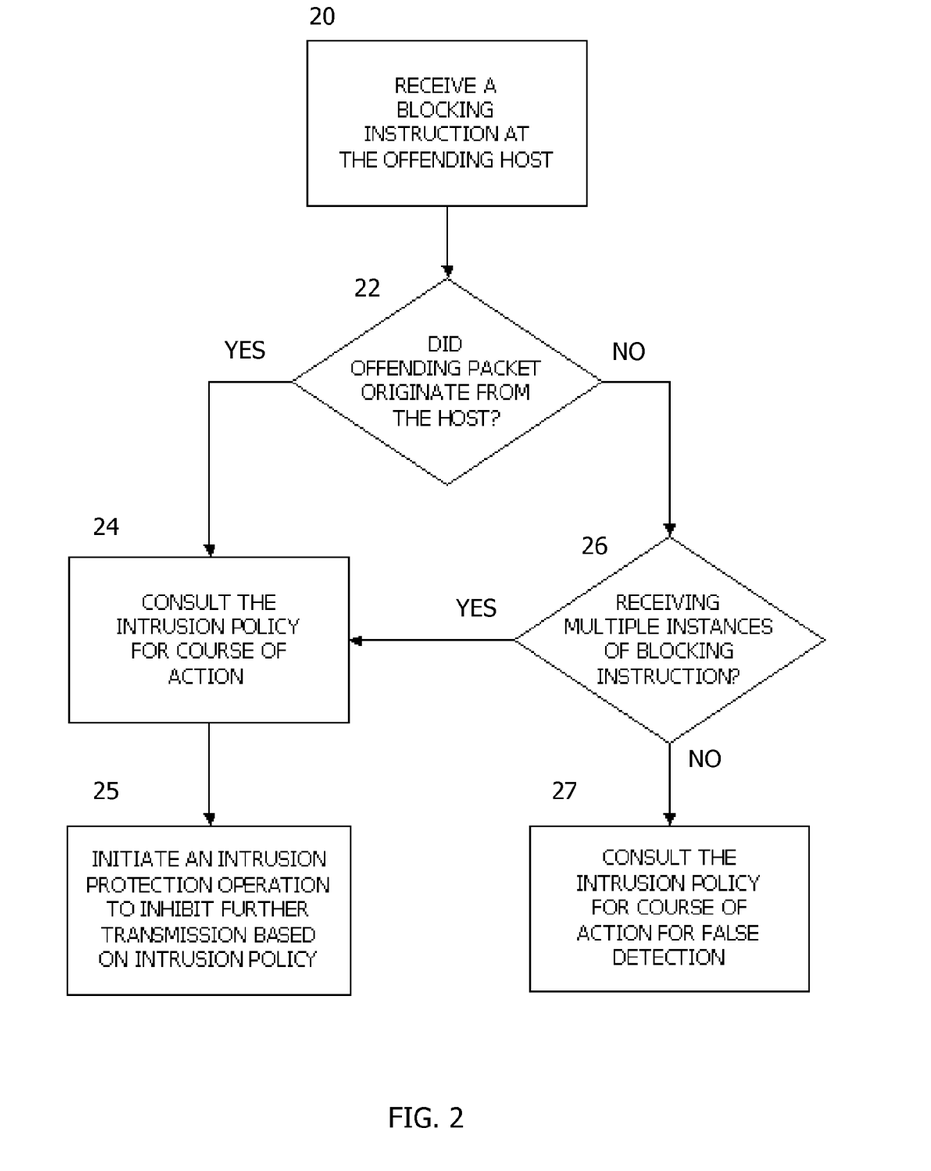
FIG. 2 is a flowchart showing the actions at an offending host computer after being notified by the computer in FIG. 1.

At the offending host, as seen in the flowchart in FIG. 2, a blocking instruction is received in block 20. The offending host verifies that the blocking instruction is likely to have originated from the host. Verification of the packet may be accomplished in some embodiments by checking the MAC address associated with the packet when applicable, such as on a local network, or for other embodiments, verification may be accomplished by checking the source and destination IP addresses, and/or the source and destination ports of the offending packet. If the offending host determines that the packet originated from the host ("yes" branch of decision block 22), then an intrusion policy implemented on the offending host is consulted for a proper course of action in block 24. An intrusion protection operation is then initiated in block 25 to inhibit further transmission of offending packets based on the intrusion policy. If the offending host determines that the packet did not originate from the host ("no" branch of decision block 22), then the offending host checks to see if it is receiving multiple instances of a blocking instruction. If the host is receiving multiple instances of a blocking instruction for packets that do not appear to have originated from the offending host ("yes" branch of decision block 26), the intrusion policy is consulted in block 24 and an appropriate intrusion protection operation is initiated in block 25. If the host is not receiving multiple instances of blocking instructions, then in some embodiments, the intrusion policy may be consulted for a course of action for a false detection in block 27.

Intrusion policies may be implemented so no action will be taken without permission from the offending host either through human interaction or other automated means. These policies may be put into place to prevent rogue blocking instructions from shutting down valid applications running on "offending" host computers. Therefore, a policy for an offending host may simply define the intrusion protection operation as logging the intrusion of the offending host in a system or event log. In some embodiments, an operator of the offending host may also be notified by posting messages on the host or by sending error messages to the operator. The offending host may further define the intrusion protection operation to send messages to other locations through email or by using other electronic transmissions such as sending a message to a personal data assistant or cellular telephone. Once the operator has been informed of the intrusion attack, the operator may take additional action by identifying the source of the intrusion. Depending on the type of intrusion, the operator may shut down the offending host or an application execution on the host responsible for generating the offending packets.

On a local or more trusted network, for example, if the intrusion was a DoS intrusion, the intrusion protection operation dictated by the policy may allow for automatic shutdown of an application or process responsible for generating the DoS. Similarly for malformed packets, the intrusion protection operation directed by the policy may automatically shut down the application or direct the offending host to automatically stop further transmission of the malformed packets. However, if the blocking instruction originated from computer on a different or remote network, then there may be a lower level of trust and the policy driving the intrusion protection operations taken by the offending host may be implemented such that an operator is informed of the intrusion attack by posting an event or an error message or sending a communication to the operator in some other manner as discussed above. Implementation of intrusion policies is a method to assist in preventing the use of blocking instructions as attacks against legitimate and valid applications running on other computers. The more trust that exists between a computer and an offending host may allow for more automated intrusion protection operations to remedy a validated intrusion.

Figure 3:
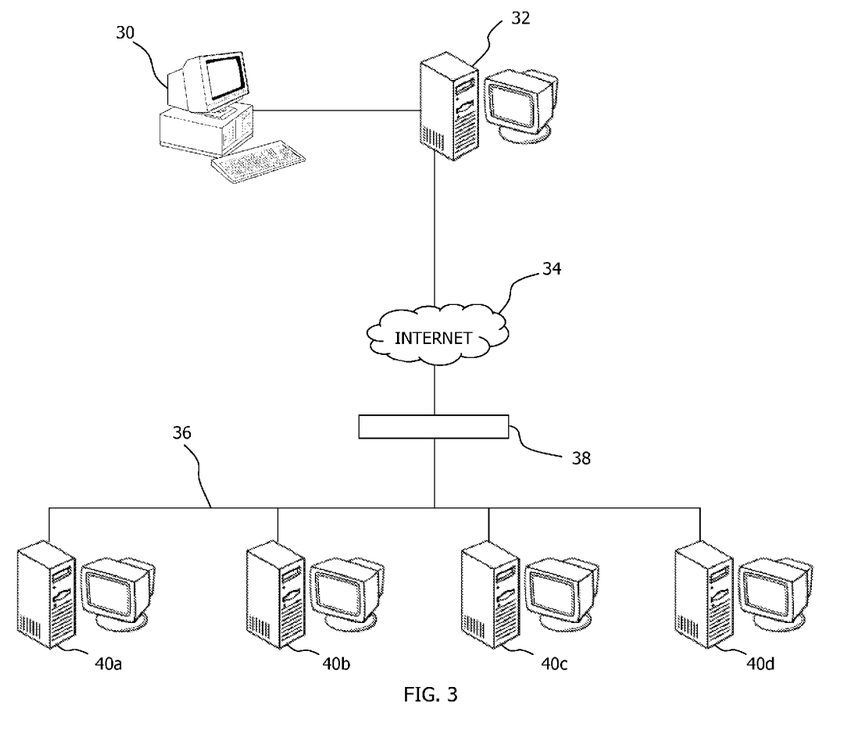
FIG. 3 is a diagram showing an exemplary intrusion by an offending host through a proxy of a protected network as shown in FIGS. 1 and 2.

In some situations, as seen in FIG. 3, the intrusion may occur through a proxy. Offending host 30 sends offending packets through a proxy computer 32 to the Internet 34 or other local or wide area networks. The offending packets arrive at a protected network 36, which may be protected by firewall 38 in some embodiments. Computers 40a-40d may detect the intrusion from the proxy computer 32 and send a blocking instruction back to the proxy computer 32. The proxy computer 32 may not detect that the intrusion has originated from itself as discussed with FIG. 2 above, but may be able to determine, through an intrusion policy, that the packets originated from the original offending host 30. After the detection is made, the proxy computer 32 in some embodiments, according to the intrusion policy may issue an intrusion protection operation that shuts down the transmission at the proxy computer 32 or notifies an operator as discussed above. In other embodiments, the proxy computer 32 may modify the offending packet to have the proper identification, i.e., IP address and ports, of the offending host 30 and then send the blocking instruction back to the offending host 30 where appropriate action may be taken. In still other embodiments, an intrusion protection operation may be implemented based on the policy at the proxy computer 32 as well as sending the blocking instruction to the offending host 30.

Figure 4:
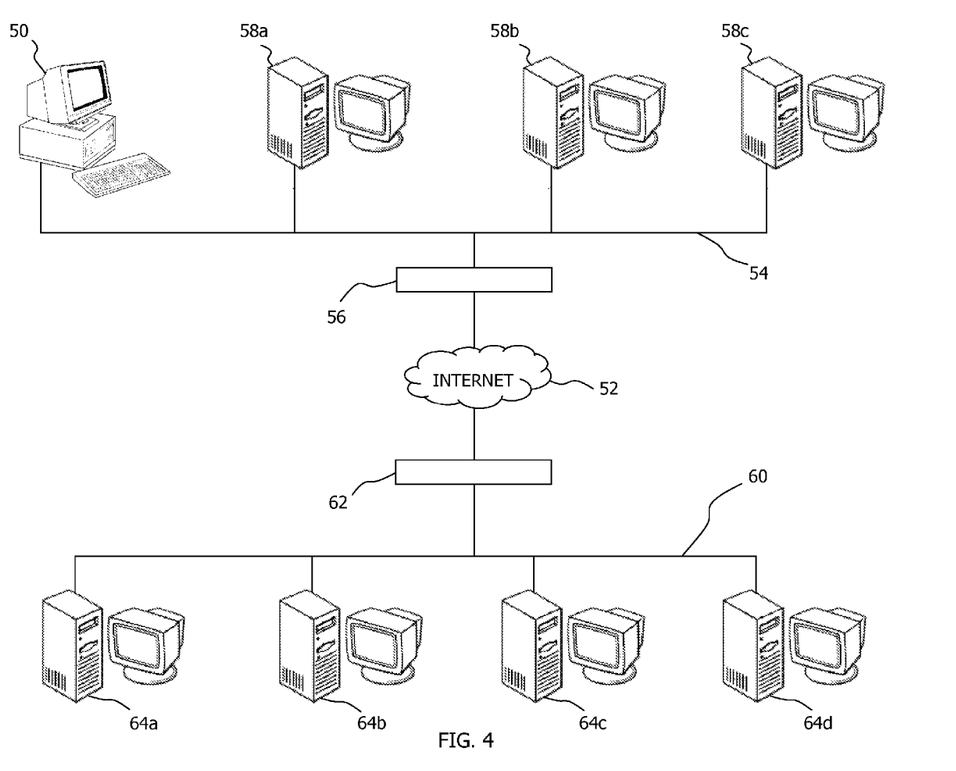
FIG. 4 is a diagram showing an exemplary intrusion by an offending host on either a local network or a protected network as shown in FIGS. 1 and 2.

Blocking instructions for intrusion protection may be implemented, in some embodiments, at the IP Layer of an operating system and use operating system calls similar to ICMP REDIRECT or ICMP ECHO RESPONSE. A special ICMP message, ICMP BLOCK may be implemented to accommodate blocking instructions. This would assist in preventing hackers from altering the intrusion handling logic (for example, through the use of digital signatures). Because a lot of intrusions are initiated by rogue applications, having the protection logic in the operating system may assist in protecting against those intrusions initiated from the application layer. Referring now to FIG. 4, an offending host 50 connected to the Internet 52 has initiated an intrusion either on, for example, computer 58a connected by a local network 54 or on computer 64a on protected network 60 connected through the Internet 52 and remote from the offending host 50. Protected network 60 may be protected by a firewall 62, in some embodiments, or other known components used in preventing intrusion attacks. Computers 64a-64d on network 60 may be servers that are the subject of the intrusion attack.

When an intrusion is detected on network 60, by either the firewall 62 or other detection devices, for example, computer 64a, a blocking instruction in the form of an ICMP BLOCK is sent back to the offending host 50 indicating that it is the originator of the intrusion. For example, computer 64a would send an ICMP BLOCK back to the offending host 50 that contains information regarding the type of intrusion and in some embodiments a portion of the packet that was transmitted as part of the intrusion. Depending on the type of intrusion, e.g. DoS, an intrusion policy could be implemented on the offending host 50 that determines an appropriate action based on the ICMP BLOCK received. At this stage, an operator of the offending host may be presented with a list of options as to the appropriate action to take as discussed above. In this example, offending host 50 is not likely a trusted host in relation to computer 64a, for example, because the two computers are on different networks. Therefore, the policy for the offending host 50 may simply define the intrusion protection operation as logging the intrusion of the offending host 50 in a system or event log.

With continued reference to FIG. 4, intrusion attacks originating from the offending host 50 may also be directed toward computers 58a-58c on the local network 54 as well as be directed through the Internet 52 to protected network 60. Using a process similar to that discussed above, an intrusion attack is detected at a computer, for example, computer 58a. Upon detection, the computer 58a sends an IMCP BLOCK back to the offending host 50. As discussed above, the ICMP BLOCK may contain a portion of the offending packet with additional information used by the offending host 50 to verify that the offending packet originated from the host 50. Once verified, the offending host 50 may take two different approaches based on the level of trust between computer 58a and the offending host 50. For example, if the intrusion policy implemented recognizes a trusted relationship between computer 58a and the offending host 50, i.e., being part of the same local area network, the intrusion protection operation dictated by the intrusion policy may allow for automatic shutdown of an application or processes responsible for generating the offending packet, such as a DoS. Similarly for malformed packets the intrusion protection operation directed by the intrusion policy may automatically shut down the application or direct the offending host 50 to automatically stop transmission of the malformed packets. Alternatively, in other embodiments, the intrusion policy may implement Variable Dynamic Throttling as disclosed in U.S. patent application Ser. No. 11/752,972 (ROC920070033US 1), which is herein incorporated by reference in its entirety. Variable Dynamic Throttling allows for varying rates of denial and permission of network traffic over a customized interval of time. However, if there isn't a trusted relationship, such as with computer 64a on a different network 60 as discussed previously, then the level of trust may be lower and the policy driving the intrusion protection operations taken by the offending host 50 may limited to informing an operator of the intrusion attack by posting an event or an error message or sending a communication to the operator in some other manner. As discussed above, intrusion policies may be used to assist in preventing the use of ICMP BLOCKS as attacks against legitimate and valid applications running on other computers. The more trust that exists between a computer such as computer 58a and the offending host 50 may allow for more automated intrusion protection operations to remedy a validated intrusion.

In other embodiments, instead of implementing intrusion detection and notification at the IP layer of an operating system, a server may be implemented on each computer that is configured to listen on a UDP port. The intrusion detection process and notification comprises similar steps but instead of sending an ICMP BLOCK, a UDP message is encapsulated with at least a portion of an offending packet and is transmitted to a UDP port of the offending host. Once received on the UDP port, similar processing would take place based on implemented intrusion policies and appropriate intrusion protection operations. Because this method is not implemented in the operating system, as is the IP layer that includes ICMP messages, an operating system API may need to be used in conjunction with the intrusion protection operation to interact with applications and processes in order to shut them down or send notifications to operators. Using UDP messages would require a server to be executing on all computers, which could be facilitated by packaging the server as part of an operating system bundle.

Figure 5:
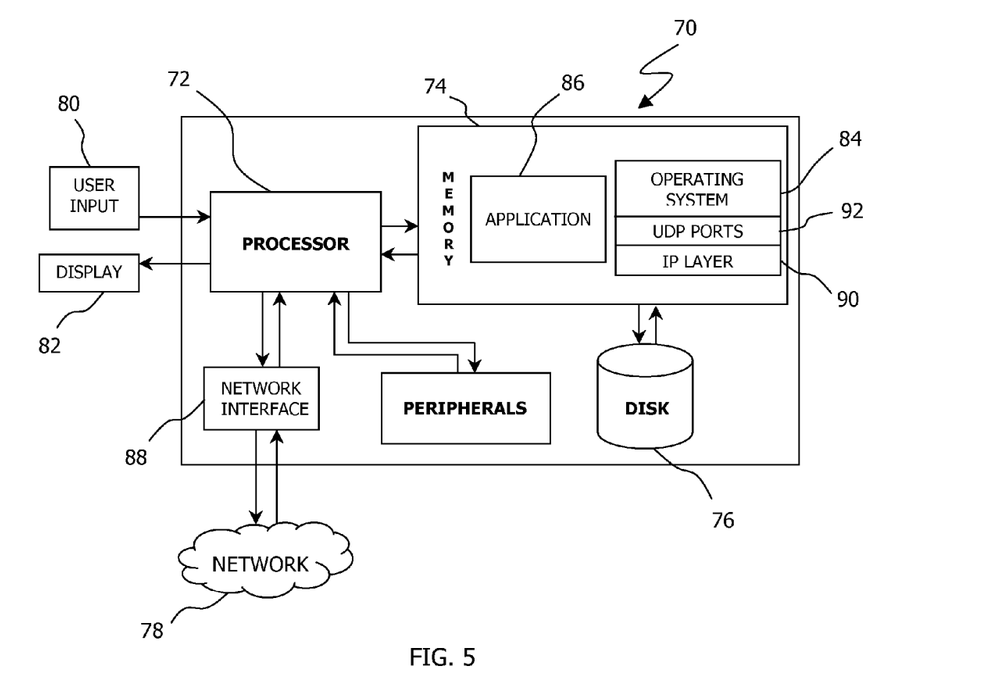
FIG. 5 is a block diagram of an exemplary hardware and software environment for a computer suitable for implementing intrusion protection illustrated in FIGS. 1-4.

FIG. 5 illustrates an exemplary hardware and software environment for an apparatus 70, which may be configured as the offending hosts 30, 50 in FIGS. 3 and 4, the proxy computer 32 in FIG. 3, or any of the computers on the local or remote networks 36, 54, and 60 in FIGS. 3 and 4. For the purposes of the invention, apparatus 70 may represent practically any computer, computer system, or programmable device e.g., multi-user or single-user computers, desktop computers, portable computers and devices, handheld devices, network devices, mobile phones, etc. Apparatus 70 will hereinafter be referred to as a "computer" although it should be appreciated that the term "apparatus" may also include other suitable programmable electronic devices, such as routers or firewalls.

Computer 70 typically includes at least one processor 72 coupled to a memory 74. Processor 72 may represent one or more processors (e.g. microprocessors), and memory 74 may represent the random access memory (RAM) devices comprising the main storage of computer 70, as well as any supplemental levels of memory, e.g., cache memories, non-volatile or backup memories (e.g. programmable or flash memories), read-only memories, etc. In addition, memory 74 may be considered to include memory storage physically located elsewhere in computer 70, e.g., any cache memory in a processor 72, as well as any storage capacity used as a virtual memory, e.g., as stored on a mass storage device 76 or another computer coupled to computer 70 via a network 78.

Computer 70 also typically receives a number of inputs and outputs for communicating information externally. For interface with a user or operator, computer 70 typically includes one or more user input devices 80 (e.g., a keyboard, a mouse, a trackball, a joystick, a touchpad, a keypad, a stylus, and/or a microphone, among others). Computer 70 may also include a display 82 (e.g., a CRT monitor, an LCD display panel, and/or a speaker, among others). The interface to computer 70 may also be through an external terminal connected directly or remotely to computer 70, or through another computer communicating with computer 70 via a network 78, modem, or other type of communications device.

Computer 70 operates under the control of an operating system 84, and executes or otherwise relies upon various computer software applications, components, programs, objects, modules, data structures, etc. (e.g. application 86) collectively referred to as "objects". Application 86, for example, may be an application, as discussed above, initiating an intrusion onto another system or a network, or application 86 may be a target of an intrusion by an offending application on this or another computer. Computer 70 communicates on the network 78 through a network interface 88 using a network protocol (e.g. implemented in the IP layer 90) and/or ports (e.g. UDP ports 92) implemented in the operating system 84, for example.

In general, the routines executed to implement the embodiments of the invention, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 5 is not intended to limit the present invention. Indeed, those skilled in the art will recognize that other alternative hardware and/or software environments may be used without departing from the scope of the invention.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art, such as applying this technique to existing network security systems. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method of protecting a network from intrusions, the method comprising:
   detecting an intrusion of an offending packet communicated by an offending host coupled to a protected network, wherein the offending host comprises a server computer upon which is executed an operating system and at least one application that originates the offending packet; and
   in response to detecting the intrusion of the offending packet, returning a blocking instruction to the offending host to initiate an intrusion protection operation on the offending host, wherein the blocking instruction inhibits further origination of offending packets by the application executed upon the offending host, and wherein returning the blocking instruction further comprises sending at least a portion of the offending packet back to the offending host with the blocking instruction;
   wherein the intrusion protection operation comprises, at the offending host:
   receiving the blocking instruction and the portion of the offending packet;
   verifying that the offending packet originated from the offending host; and inhibiting transmission of a subsequent outbound offending packet by the offending host based on an intrusion policy, wherein inhibiting transmission further comprises:
returning the subsequent outbound offending packet to the application, wherein the offending packet and the subsequent outbound offending packet originated from the application; and
ending a connection with the application.

2. The method of claim 1 wherein verifying further comprises:
comparing corresponding MAC addresses associated with the offending packet and the offending host.

3. The method of claim 1 wherein verifying further comprises:
comparing source and destination IP addresses associated with the offending packet and the offending host.

4. The method of claim 1 wherein verifying further comprises:
checking TCP or UDP source and destination ports associated with the offending packet and the offending host.

5. The method of claim 1 wherein the offending packet is a TCP packet and verifying further comprises:
checking sequence numbers associated with the first offending packet and the offending host.

6. The method of claim 1 wherein sending at least a portion of the offending packet back to the offending host further comprises:
encapsulating the portion of the offending data packet into a UDP packet; and
returning the encapsulated portion of the first offending data packet to the offending host as a notification packet.

7. The method of claim 6 wherein the intrusion protection operation comprises, at the offending host:
receiving the encapsulated UDP packet containing the portion of the offending packet; and
verifying that the offending packet originated from the offending host.

8. The method of claim 7 wherein the intrusion protection operation comprises, al the offending host:
terminating the application.

9. The method of claim 1 wherein the intrusion protection operation comprises, at the offending host:
posting an event or error message for an operator of the offending host.

10. The method of claim 1 wherein the intrusion protection operation comprises:
accessing an intrusion policy on the offending host.

11. The method of claim 1 wherein detecting the intrusion and returning the blocking instruction are implemented at an IP layer.

12. The method of claim 11 wherein the blocking instruction is an ICMP message.

13. The method of claim 12 wherein the ICMP message includes a copy of the first offending packet.

14. The method of claim 1 wherein detecting the intrusion and returning the blocking instruction are implemented in a network device.

15. The method of claim 14 wherein the network device is a firewall, a router, or a computer.

16. A method of protecting a network from intrusions, the method comprising:
receiving a blocking instruction and a portion of an offending packet at a host coupled to a protected network, wherein the host comprises a server computer upon which is executed an operating system and at least one application that originates the offending packet, wherein the offending packet is of the type associated with an intrusion attack, and wherein the blocking instruction is returned to the host in response to detection of an intrusion of the offending packet and to initiate an intrusion protection operation on the host;
verifying that the offending packet originated from the host; and
in response to the verification of the offending packet originating from the host, initiating the intrusion protection operation on the host thereby inhibiting origination of a subsequent outbound offending packet by the application executed upon the host based on an intrusion policy, wherein inhibiting origination further comprises:
returning the subsequent outbound offending packet to the application, wherein the offending packet and subsequent outbound offending packet originated from the application; and
ending a connection with the application.

17. The method of claim 16 wherein the host comprises:
a first host configured as a proxy; and
a second host originating the offending packet and transmitting the offending packet through the proxy,
wherein the blocking instruction is received at the proxy.

18. The method of claim 17 wherein the proxy transmits the blocking instruction to the second host.

19. An apparatus comprising:
a processor; and
program code configured to be executed by the processor to protect a network from intrusions at a host coupled to a protected network, wherein the host comprises a server computer upon which is executed an operating system and at least one application that originates an offending packet, the program code resident in a memory and configured to receive a blocking instruction and a portion of the offending packet, verify that the offending packet originated from the host, and in response to the verification of the offending packet originating from the host, initiate an intrusion protection operation on the host thereby inhibiting origination of a subsequent outbound offending packet by the application executed upon the host based on an intrusion policy, wherein the blocking instruction is returned to the host in response to detection of an intrusion of the offending packet and to initiate the intrusion protection operation on the host, and wherein the program code is configured to inhibit origination further by:
returning the subsequent outbound offending packet to the application, wherein the offending packet and subsequent outbound offending packet originated from the application; and
ending a connection with the application.

20. The apparatus of claim 19 wherein the computer is a first computer configured as a proxy, the apparatus further comprising:
a second computer having a second memory; and
second program code of the application, the second program code resident in the second memory of the second computer and configured to originate the offending packet and transmit the offending packet through the proxy,
wherein the blocking instruction is received at the proxy.

21. The apparatus of claim 20 wherein the proxy is further configured to transmit the blocking instruction to the second computer.

22. A program product, comprising:
a non-transitory computer readable storage medium; and a program code configured to protect a network from intrusions, the program code resident on the computer readable storage medium and configured to detect an intrusion of an offending packet communicated by an offending host coupled to a protected network, wherein the offending host comprises a server computer upon which is executed an operating system and at least one application that originates the offending packet, wherein the program code is further configured to, in response to detecting the intrusion of the offending packet, return a blocking instruction to the offending host to initiate an intrusion protection operation on the offending host, wherein the blocking instruction inhibits further origination of offending packets by the application executed upon the offending host, wherein the program code is configured to return the blocking instruction further by sending at least a portion of the offending packet back to the offending host with the blocking instruction;

wherein the intrusion protection operation is performed at the offending host and receives the blocking instruction and the portion of the offending packet, verifies that the offending packet originated from the offending host, and inhibits transmission of a subsequent outbound offending packet by the offending host based on an intrusion policy, wherein the intrusion protection operation inhibits transmission further by returning the subsequent outbound offending packet to the application and ending a connection with the application, and wherein the offending packet and the subsequent outbound offending packet originated from the application.

* * * * *